US005839704A

United States Patent [19]

Appleman

[11] Patent Number: 5,839,704

[45] Date of Patent: Nov. 24, 1998

[54] CAMERA SUPPORT DEVICE

[76] Inventor: Morris Appleman, 4563 Deselis, Encino, Calif. 91316

[21] Appl. No.: 899,540

[22] Filed: Jul. 24, 1997

[51] Int. Cl.[6] .................... F16M 11/04

[52] U.S. Cl. .................... 248/178.1; 224/908; 224/584; 248/177.1

[58] Field of Search .................... 248/161, 405, 248/177.1, 176.1, 444, 178.1; 294/137, 139; 224/908, 265, 584

[56] References Cited

U.S. PATENT DOCUMENTS

| | | | |
|---|---|---|---|
| 1,993,485 | 3/1935 | Paul | 95/86 |
| 2,270,931 | 1/1942 | Corcoran | 88/36 |
| 2,552,205 | 5/1951 | Moss | 95/86 |
| 2,636,822 | 4/1953 | Anderson | 95/86 |
| 2,658,435 | 11/1953 | Sarvoy | 95/86 |
| 2,711,122 | 6/1955 | Klumpp | 95/86 |
| 2,771,826 | 11/1956 | Shapiro | 95/86 |
| 2,806,416 | 9/1957 | Jones, Jr. | 95/86 |
| 3,661,308 | 5/1972 | Walters | 224/5 V |
| 3,767,095 | 10/1973 | Jones | 224/5 V |
| 4,083,480 | 4/1978 | Lee et al. | 224/5 V |
| 4,526,308 | 7/1985 | Dovey | 224/265 |
| 4,963,904 | 10/1990 | Lee | 334/82 |
| 4,967,282 | 10/1990 | Malavasi | 358/229 |
| 5,042,763 | 8/1991 | Wong | 248/178 |
| 5,332,136 | 7/1994 | Rudolph | 224/185 |

*Primary Examiner*—Leslie A. Braun
*Assistant Examiner*—Kimberly T. Wood
*Attorney, Agent, or Firm*—Trojan Law Offices; R. Joseph Trojan; Eric J. Aagaard

[57] ABSTRACT

A device for supporting a camera or similar device comprising; a vertical rod, a camera mount on top of said rod, a vertically positionable bracket which may be placed along or about said rod, an upper support arm attached to said bracket which can be both vertically and laterally about said rod and having a variable length and pad mounted to its end for bracing against a user, a lower support arm attached to said rod below the upper support arm being adjustable in length and having a lower pad attach to its end for bracing against a user's body so as to provide support and stability when using a camera attached thereto.

20 Claims, 5 Drawing Sheets

22 20 24 26 12 10 16 50 47 48 32 46 44 42 40 34 30 36 5 62 54 66 68 60 52 64 14 70

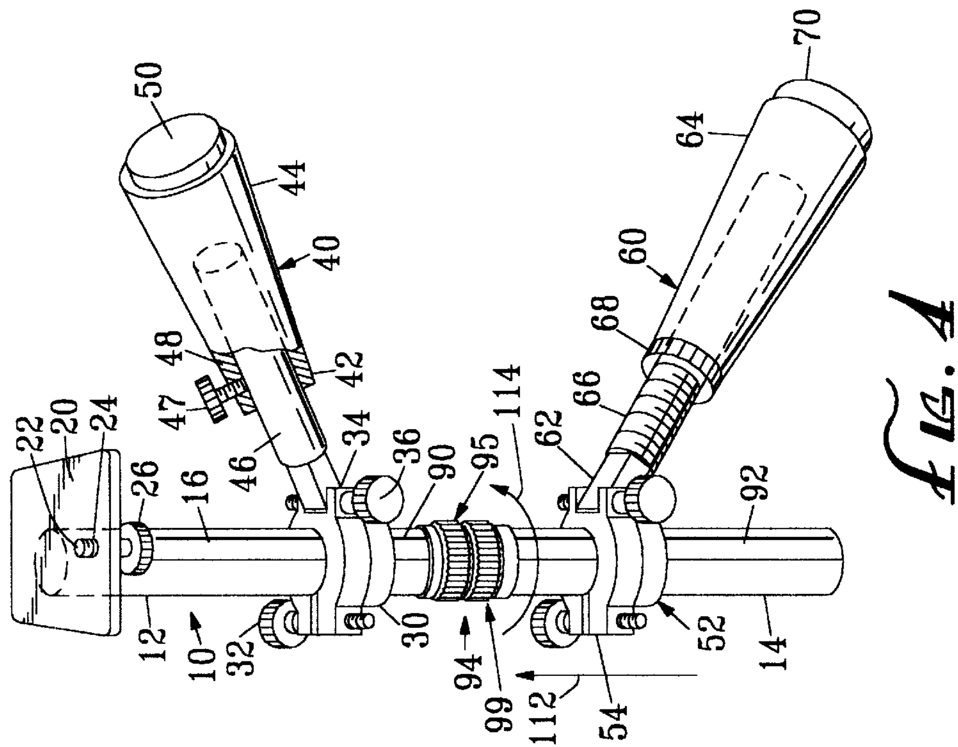
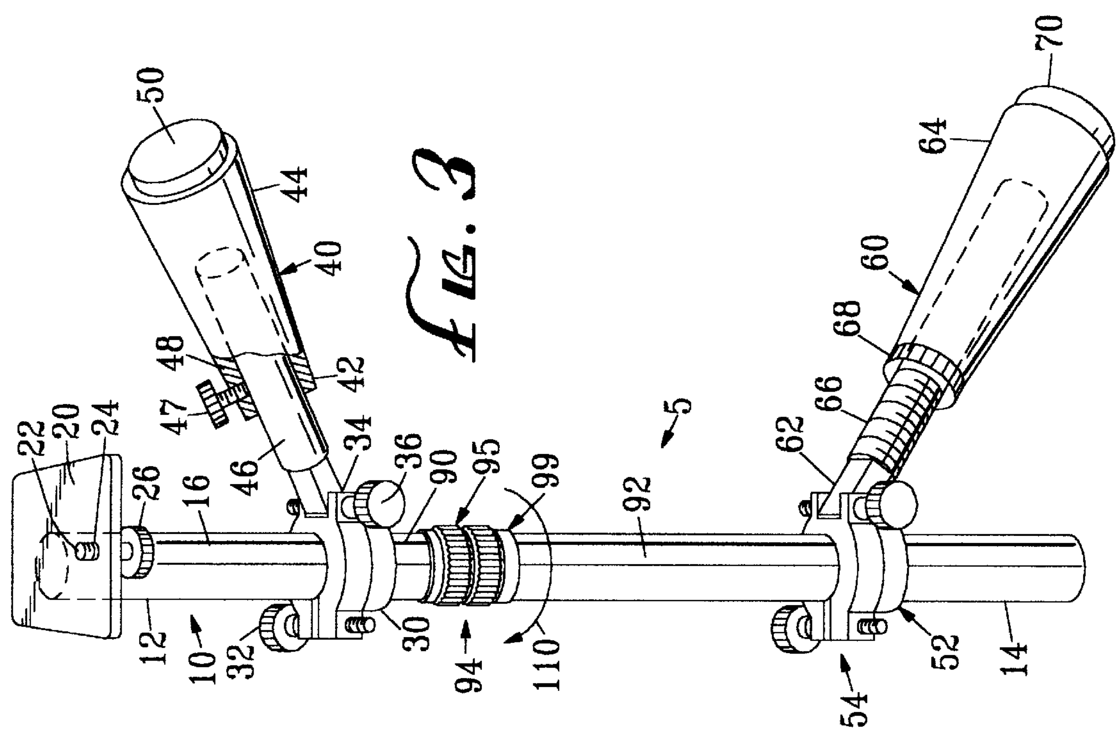

CAMERA SUPPORT DEVICE

BACKGROUND OF THE INVENTION

1. Field of the Invention

This invention relates to portable camera mounts which are supported or braced against the body to aid in the operation of the attached camera or other similar device.

2. Background Art

Since the beginning of the photographic art, photographers have sought to use their cameras and other photographic equipment in various locations and settings. The key to effective use of a camera in such settings has been to maintain the camera in a stable position while being capable of quickly switching positions to obtain varied shots. Most often the stability of the camera is dependant upon the ability of the photographer to hold the camera steady. However, often the photographer is not as steady as he or she would like, and use of the body alone to steady the camera can fatigue the user quickly.

Many inventions have been created to solve these problems by aiding in the operation of a camera or other similar photographic device. A goal of some of these inventions has been to increase the stability of, and/or control over, the camera. This increase in stability is desired by photographers since decreasing or eliminating unwanted movement or vibration of the camera typically greatly improves the photographs taken. An increase in control of the camera is equally important as it both provides the photographer a better opportunity to obtain the picture sought and reduces the potential for damage to the photograph equipment.

Another goal of these types of devices has been to reduce the photographer's fatigue. When used, cameras and other photographic equipment are typically held in, and supported solely by, the photographer's hands. Due the fact that this type of equipment can be of significant weight and that during use it must be raised and lowered repeatedly, a typical photographer can become fatigued quickly. Obviously, fatigue can greatly affect the photographers ability to continue to use and control the photographic equipment to achieve the specific results sought.

Several prior inventions have attempted to solve these problems with mixed results. The most common example of these devices are tri-pods. As the name implies tri-pods are three legged devices which are self-standing and provide a base for the camera or device used. Tri-pods provide stability and control as they carry the entire weight of the camera and typically are fully adjustable in many axes. As such, a tri-pod allows the photographer to use the camera without being fatigued by carrying and moving the camera about.

However, tri-pods possess particular disadvantages as well. Particularly, to keep the camera at a reasonable height above the ground and maintain stability, the legs of the tri-pod will be spread far apart. This wide stance can be a considerable hazard resulting in tripping passerbys and/or tipping over of the tri-pod and any equipment mounted thereto. This problem can be limited somewhat by reducing the distance between the legs, but as this distance is decreased the overall stability of the tri-pod is also decreased. An additional problem with a tri-pod is its bulk and weight. This factor causes significant difficulty in using the tri-pod as a portable support device. Finally, tri-pods typically are difficult to set-up and adjust on uneven terrain.

Mono-pods are another common device designed to provide some degree of stability and support. As the name implies, mono-pods are in effect single legged tri-pods. A mono-pod is used primarily just to support the weight of the camera. Due to being much lighter then tri-pods, mono-pods are much more portable. Also with only one leg mono-pods are much more adaptable to uneven terrain.

Unlike tri-pods, mono-pods cannot stand on their own. As such, the photographer is provided no lateral support and must support and balance the camera with one or both hands. Additionally, although a mono-pod can be substantially lighter than a tri-pod, it still can be of such a weight as to reduce its capability as a portable support device and thus fatigue a user quicker than necessary.

No single prior invention has combined the qualities of the invention described herein. The camera support device described herein is much smaller and lighter then the typical tri-pods and mono-pods. By use of support arms which rest directly against the user's body, the herein invention provides the photographer stability and control while using the camera. The size of this invention as well as the fact it can easily be made out of light weight material, allows the invention to be very portable and convenient to use.

SUMMARY OF THE INVENTION

This invention provides an improved device for stabilizing and controlling cameras, photographic equipment or similar devices. This invention meets its objectives by utilizing the beneficial aspects of being lightweight, small in size, and designed so as to use the user's body to provide the support and stability sought. Further, this invention is sized, shaped, and operates in such a manner so that a user can quickly and easily operate a camera with sufficient control to obtain the results desired.

The first primary object of this invention is to support a camera or similar device in such a manner that the camera is significantly more stable than when a photographer employs either his hands alone or a mono-pod. Since shaking, vibration or bumping can directly affect the quality of the final images, the more stable the camera is, the better. Support can be increased in part by having a device which properly transfers the weight of a camera to a user's body. Also of importance is the device's ability to transfer a torsional load caused by an offset weight such as that of a telephoto lens extending outward from a camera body mounted to the device.

The other primary object of the invention is to provide a device which will increase control over the camera mounted to it. As noted above, controllability is of utmost importance to a photographer. Without proper control shots may be missed or interfered with, and expensive photographic equipment may be heavily damaged. Like with the support object, controllability is also enhanced by the proper transfer of loads.

Another object of the invention is to provide a device which will. reduce fatigue of the user by supporting the weight of the camera. By structuring the invention so as to transfer the weight of and torque produced by, the camera from the photographer's hands and arms to his or her body, the user's arms and hands are less likely to become tried or fatigued. Also, by allowing the camera to remain at, or closer to, the photographer's face, fatigue is reduce as the camera does not have to be raised and lower as often.

An additional object is to provide a device which is fully adjustable to conform to any body size and/or shape. Achieving this object allows persons of various chest and abdomen sizes and shapes to use the device.

Another object of the invention is to provide a device which is relatively small, not bulky, and lightweight so to be very portable. As noted, portability is essential to any user who wishes to use his or her camera in a variety of locations.

The final object of this invention is to provide a device which is simple and inexpensive to manufacture. Obtaining this goal will allow the device to be sold to the public at a low final cost per unit.

These and other more specific objects will appear upon reading the following specification and claims and upon considering in connection therewith the attached drawings to which they relate.

As noted in the aforementioned objects, the design of the device seeks to increase control, stability and reduce fatigue of the user. A proper transfer of the load of the camera, or other device carried by the device, helps to achieve these goals. The camera mount device is typically configured with two adjustable support arms projecting outward from a vertical rod which has a camera mount at its top. These support arms are defined as being the upper and lower support arms. Typically, the upper support arm will rest against the user's chest while the lower arm will rest against the user's abdomen (support can also be obtained when the user rests his or her chin, instead of his or her chest, against the upper support pad). The adjustability of the length of the support arm(s) allows users of various body shapes and sizes to conform the device to their own bodies.

By holding onto the vertical rod the user can force the device against his or her body. In so doing, a portion or all, of the weight of the camera be transferred through the device into the user's body. Further, by holding the device near to the top of the vertical rod any torsional load created by an off-set load (such as that caused by a telephoto lens) will be transferred through the support arm(s) and into the user's body. This transfer of loads and the ability of the device to conform to individual user's body styles, allow the user to increase stability and control while reducing fatigue.

BRIEF DESCRIPTION OF THE DRAWINGS

The advantages of the invention can be more clearly understood by reference to the drawings in which:

FIG. 3 is a front perspective view of the device showing the telescoping means with the lower portion of the vertical rod extended;

FIG. 4 is a front perspective view of the device showing the telescoping means with the lower portion of the vertical rod slid into the upper portion;

DETAILED DESCRIPTION OF THE PREFERRED EMBODIMENT

Figure 1:
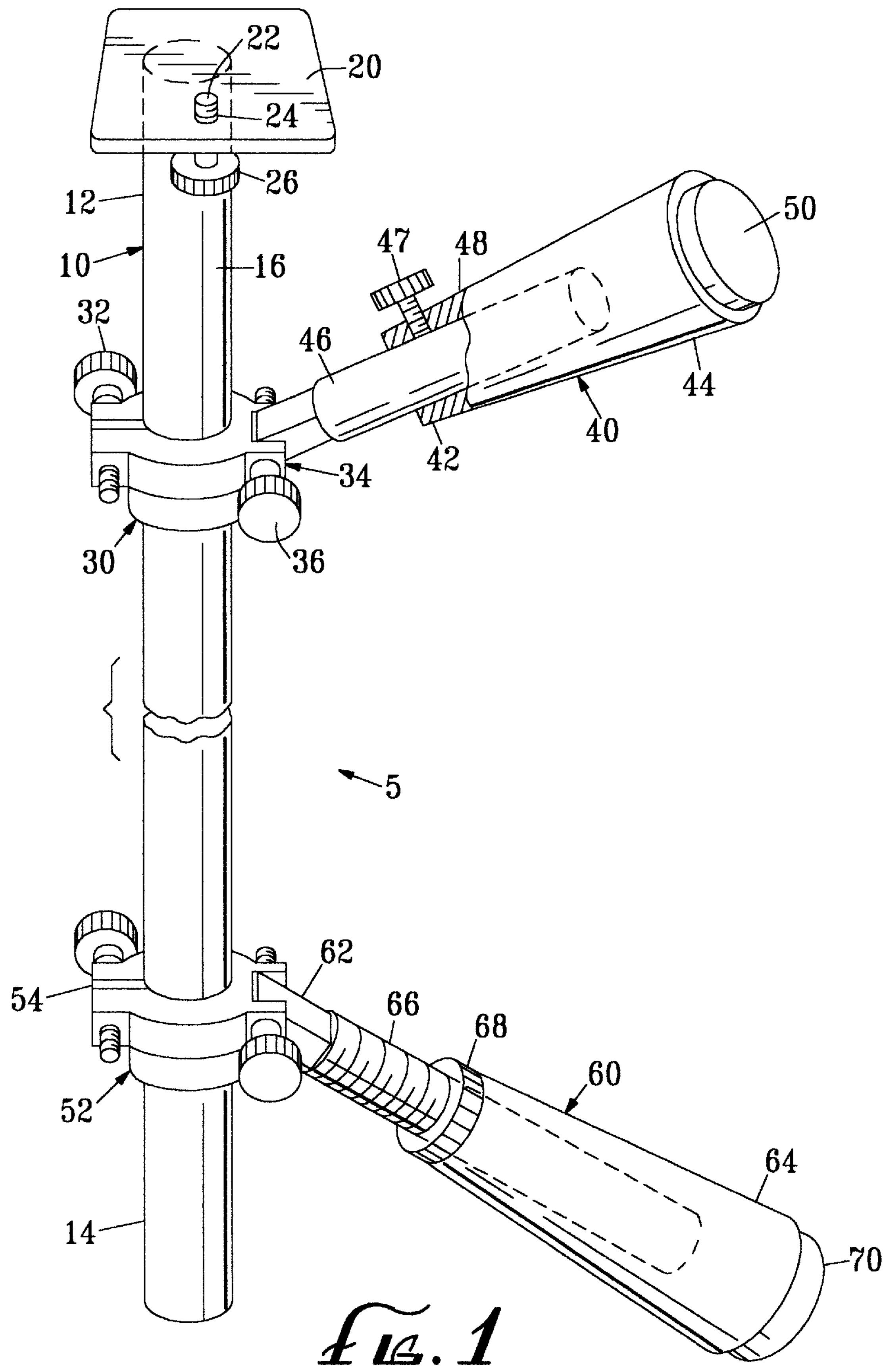
FIG. 1 is a front perspective view of the device.

The primary elements of this invention, device (5), includes a vertical rod (10), a camera platform (20) mounted on top of the vertical rod, a vertically positionable bracket (30) slidably mounted along the vertical rod (10), an adjustable upper support arm (40) mounted to the bracket and extending outward from the vertical rod (10) and ending in an upper pad (50), and an adjustable lower support arm (60) mounted to the vertical rod (10) below the upper support arm (40) and also extending outward from the vertical rod (10) and ending in a lower pad (70). Each of these primary elements can be further defined.

The vertical rod (10) primary element has a top end (12) a bottom end (14), end cap (18), outer surface (16) and a longitudinal axis (11).

Another primary element is the camera platform (20). This is the element of the invention which the supported item, a camera or the like, is directly mounted to. The camera platform is attached to top end (12) of vertical rod (10). Also, the camera platform (20) contains a means for securing a photographic camera or a similar device onto the camera platform (20).

The next primary element is vertically positionable bracket (30). This bracket is slidably mounted to vertical rod (10) between top end (12) and bottom end (14) such that bracket (30) may be positioned along and rotated laterally about vertical rod (10). This form of mounting allows bracket (30) to be adjusted for optimum use by placing bracket (30) in any position along vertical rod (10) and/or rotating bracket (30) laterally about vertical rod (10). Lastly bracket (30) has a means for locking it in place along and about vertical rod (10).

Upper support arm (40) is the next primary element of this invention. Upper support arm (40) has a first end (42), a second end (44) positioned opposite of the first end, a longitudinal axis, and a length. Also, mounted to the second end of the upper support arm is upper pad (50). Upper pad (50) functions to be placed against the user in order to provide bracing or support for the camera. Finally, there is a means for attaching upper support arm (40) to vertically positionable bracket (30).

The last primary element is lower support arm (60). This arm contains a first end (62), an opposing second end (64), a longitudinal axis and a length. Lower support arm (60) is slidably mounted to vertical rod (10) below vertically adjustable bracket (30) and above lower end (14) of vertical rod (10) by lower bracket (52). Like with upper support arm (40), lower support arm (60) may be locked in a fixed position along the vertical rod (10). This locking is performed by a means for locking (54) said lower bracket (52) in place. Also, mounted at second end (64) of lower support arm (60) is lower pad (70) for contacting the body of the user. Lower support arm (60) also works to provide support to device (5) by bracing against the user.

In the preferred embodiment the primary elements of this invention are further defined as follows. It should be noted that the preferred embodiment of this invention includes elements which perform the function of the means elements described above.

It is preferred that vertical rod (10) also include a bottom mount means and a telescoping means.

The bottom mount means is located at bottom end (14) of vertical rod (10) and is sized and positioned for attaching camera mount (5) to a separate tri-pod, mini-pod, other camera mount or a similar device. The bottom mount means could be of any shape, size and/or structure which would operate to provide a secure connection to be made and maintained to another device. It is preferred that the bottom mount means comprises threaded mount (80) having a longitudinal axis (82). Threaded mount (80) being formed out of, and as an integral part of, end cap (18). In this embodiment threaded mount (80) and end cap (18) should be shaped to be substantially flush to a plane perpendicular to longitudinal axis (11) of vertical rod (10) such that longitudinal axis (82) of threaded mount (80) is aligned with longitudinal axis (11) of vertical rod (10). Further, threaded mount (80) should be sized to receive a standard photographic mounting screw.

The telescoping means of vertical rod (10) can also be of many types. However, it is preferred that the telescoping of vertical rod (10) be carried out by further comprising vertical rod (10) of an upper portion (90), a slidable lower portion (92) and a means to lock the position of the portions relative to each other. Wherein upper portion (90) is uniformly hollow along its length and sized to receive lower portion (92) such that lower portion (92) is slidably mounted within upper portion (90). In this configuration the overall length of vertical rod (10) may be varied by sliding lower portion (92) in or out of upper portion (90). It is important that when device (5) is used that the position of lower portion (92) relative to upper portion (90) may be maintained at a specific desired length. Although position of the two portions relative to each other may be maintained my many means including an interference fit between the outer diameter (93) of lower portion (92) and the inter diameter (91) of upper portion (90). However, it is preferred that the means to lock the position of the portions relative to each other be a twist lock (94). Such twist locks are common to the photographic art. Twist locks are typically found on telescoping legs of prior art tri-pods and mono-pods. Twist lock (94) comprises an upper grip (95) and a lower grip (99). In a typical twist lock one grip is fixed while the other rotates. As used with device (5) upper grip (95) would be attached to the lowest end of upper portion (90). Upper Grip (95) would further comprise downward protecting threaded leafs (96) having gaps (97) between each leaf. The thickness of each leaf (96) decreases down their lengths and the interior diameter (98) of leafs (96) are sized to receive the outer diameter (93) of lower portion (92). Lower grip (99) being hollow with threaded interior surface (100) sized to receive and engage the lower portion of threaded leafs (96). As such, depending on which way lower grip (99) is rotated relative to upper grip (95) leafs (96) may be either tighten or loosened onto the outer diameter (93) surface of lower portion (92). In this configuration rotating lower grip (99) operates to lock the position of lower portion (92) relative to upper portion (90).

As noted above, the camera platform (20) contains a means for securing photographic camera or similar devices onto the camera platform (20). It is preferred that this means comprises a mounting screw (22) having an outward portion (24) positioned to project outward from the camera platform (20). Said mounting screw (22) being sized, shaped and positioned to be received by a screw mount of a camera or similar device. This mounting screw can be rotatably mounted to the camera platform (20) and further contain a securing knob (26) positioned on mounting screw (22) sufficiently below the outward projecting portion (24) of mounting screw (22) so as not to interfere with mounting screw (22) being received by the screw mount of the a camera or similar device. Securing knob (26) being sized and positioned to be rotated by a user. Further securing knob (26) is attached to mounting screw (22) so that rotating securing knob (26) will rotate mounting screw (22). Rotating mounting screw (22) makes it easier to attach a camera or other device to camera platform (20) since the camera can be held still relative to camera platform (20) while mounting screw (22) is rotated into a receiving mount.

Upper support arm (40) is further comprised of a fixed portion (46) attached to first end (42) of upper support arm (40) and a slidable portion (48) attached to second end (44).

Slidable portion (48) is slidably attached to fixed portion (46) so as to be capable of transversing along fixed portion (46) so as to vary the length of upper support arm (40). Also, the preferred embodiment includes a means for locking the slidable portion in place along the fixed portion. It is preferred that this locking means is a first contact screw (47) which passes through slidable portion (46) and engages fixed portion (48) such that sufficient force may be applied to fixed portion (48) to prevent movement of slidable portion (46) relative to fixed portion (48). However, this embodiment of the locking means is just one of many possibilities. Finally, mounted to second end (44) is upper pad (50). Upper pad (50) being positioned so that it may be placed against the body of a user to provide bracing and support of device (5).

As noted above, vertically positionable bracket (30) has a means for locking the bracket in place along vertical rod (10). It is preferred that this means is embodied by a second contact screw (32) mounted through the bracket to contact outer surface (16) of the vertical rod (10). The second contact screw (32) must be positioned and operated such that it is capable of exerting sufficient force upon the surface of vertical rod (10) to prevent movement of the bracket (30) along or about vertical rod (10). The bracket also comprises joint (34) sized to receive and retain first end (42) of upper support arm (40). Joint (34) must retain said first end (42) such that upper support arm (40) may be pivoted about joint (34) such that upper support arm (40) may rotate in the vertical plane and in so doing be placed in a stored position which is substantially parallel and adjacent to vertical rod (10). Also, joint (34) can include a means for locking the joint and preventing movement of upper support arm (40) relative to vertical rod (10). It is preferred that this locking means is third contact screw (36) mounted through the joint (34) so as to contact first end (42) of the upper support arm (40). The third contact screw (36) must be positioned and operate to be capable of exerting sufficient force on the first end (42) of the upper support arm (40) as to prevent movement of the support arm (40) relative to vertical rod (10). However, as with the other locking means described herein this method is but one of many alternatives.

It is preferred that lower support arm (60) has an adjustable length. This variable length can be carried out by several possible means. One such means is by use of a threaded screw (66) received by a threaded mount (68), which when one is turned relative to the other the length of the lower support arm (60) may be varied. This threaded screw (66) being mounted outward from the first end (62) of the lower support arm (60) in alignment with the longitudinal axis of said lower support arm (60). The threaded mount (68) being sized to receive the threaded screw (66) being attached to the second end (64) of the lower support arm (60), aligned with the longitudinal axis of the lower support arm (60) and positioned such that it may be rotated about the threaded screw (66) to alter the length of the lower support arm (60). However, the lower support arm may also be of a fixed length to minimize the complexity and construction costs of device (5). Finally, there is the lower pad (70) which is mounted to the second end (64) of the lower support arm (60) and positioned so that it may be placed against the body of the user to provide additional support for the device described herein.

Although it can be, lower support arm (60) does not have to be slidably mounted to vertical rod (10). It is preferred to reduce complexity and construction costs that lower support arm (60) be fixed in a single position to vertical rod (10).

The preferred embodiment is just one of many possible embodiments of the the invention covered by the claims of this application. Many additions or modifications of the elements of this device may be made. For example, many of the elements could be made of various lengths to better accommodate various body shapes. Also, the positions of various elements could be moved about relative to each other.

The preferred embodiment of this invention is shown in the included drawings.

FIG. 1 is a front perspective view of device (5). In this view all the major elements of the invention can be seen. Attached to vertical rod (10) at its top end (12) is camera platform (20). Below camera platform (20) is vertically positionable bracket (30), which as can be seen, operates to slide along vertical rod (10). Extending out away from vertically positionable bracket (30) is adjustable upper support arm (40) containing upper pad (50). Below bracket (30) and pad (50) is lower support arm (60) which contains lower pad (70). In this view lower support arm (60) is shown as being vertically adjustable along vertical rod (10). However, as noted above lower support arm (60). may also be fixed by being attached directly to vertical rod (10).

Figure 2:
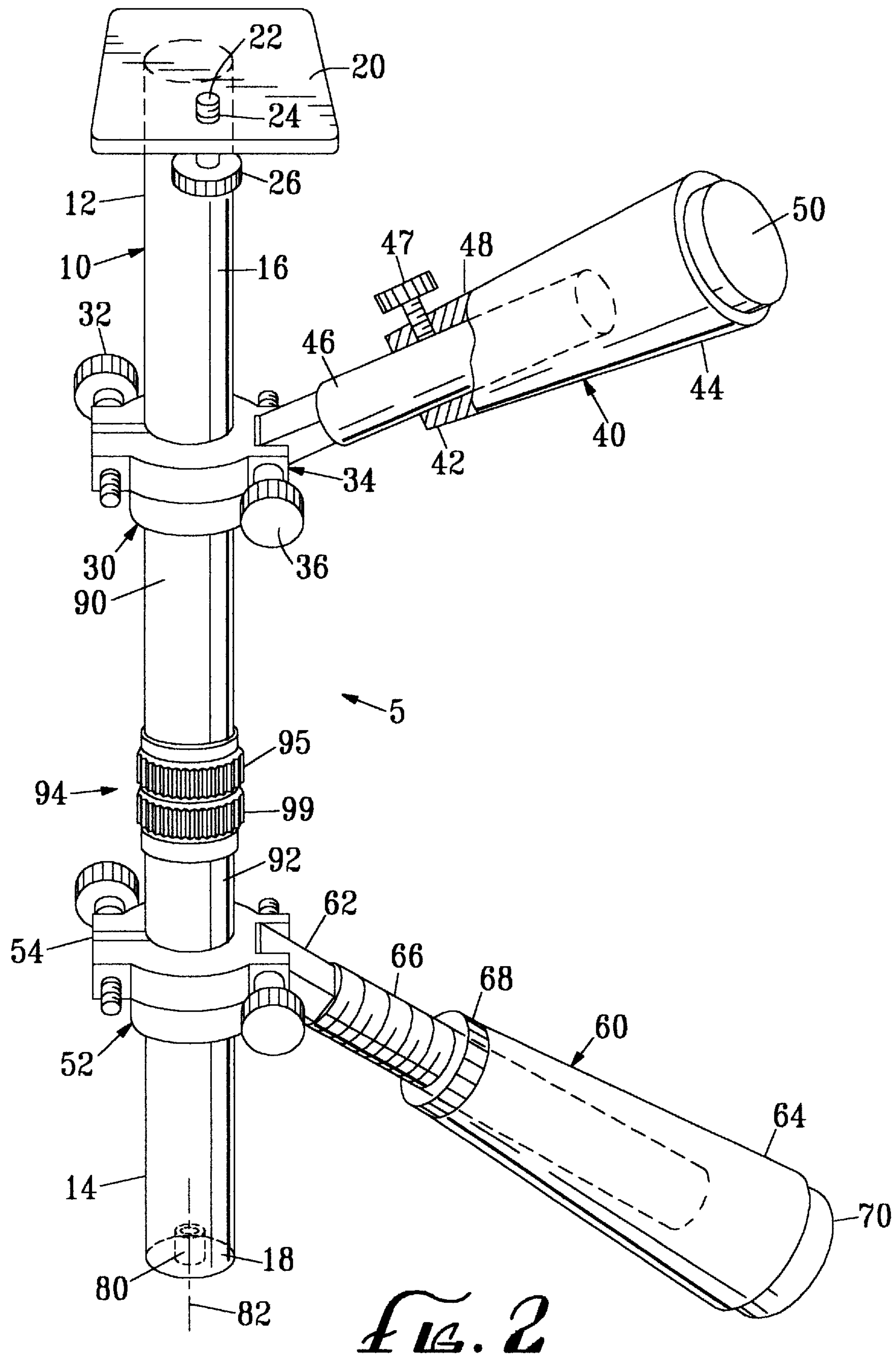
FIG. 2 is a front perspective view of the device showing the telescoping means.

FIG. 2 is also a front perspective view of device (5). FIG. 2 differs from FIG. 1 in that it shows the addition of the telescoping means. FIG. 2 shows upper portion (90) and lower portion (92) of vertical rod (10) as well as twist lock (94). As can be seen twist lock (94) comprises upper grip (95) and lower grip (99). As noted above, lower portion (92) can be slid into or out of the interior of upper portion (90) and can be locked in to place by operation of twist lock (94). FIG. 2 also shows threaded mount (80) mounted into end cap (18).

FIG. 3 shows device (5) in an elongated position. As can be seen lower portion (92) has been slid out from upper portion (90). Also shown is twist lock (94) which operates to retain the position of lower portion (92) relative to upper portion (90). To release twist lock (94) the user must rotate lower grip (99) relative to upper grip (95) such as in a direction as shown by arrow (110).

FIG. 4 shows device (5) after lower portion (92) has been slid or telescoped into upper portion (90), such that the overall length of vertical rod (10) has been shortened. This sliding is represented by arrow (112). To lock lower portion (92) in position lower grip (99) should again be rotated, this time in the opposition direction as shown by arrow (114).

Figure 5:
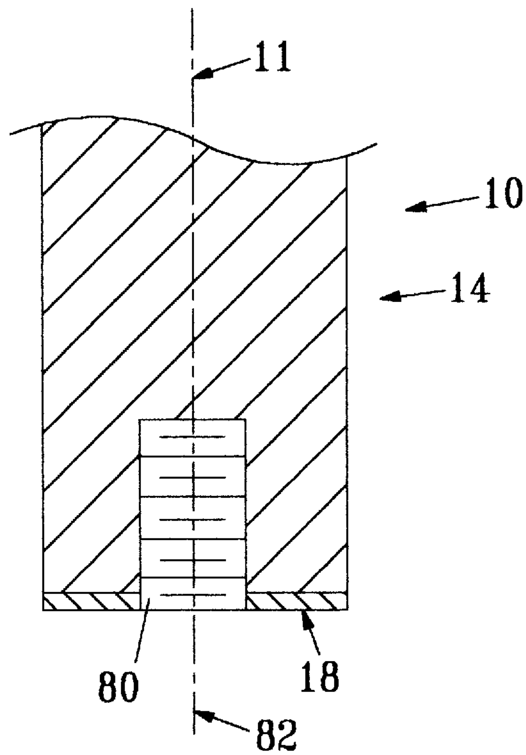
FIG. 5 is a detail cross-section of the lower mount.

FIG. 5 shows a cross sectional view of the lower end (14) of vertical rod (10). In this view it is shown that threaded mount (80) lies in end cap (18) with its longitudinal axis (82) in alignment with the longitudinal axis (11) of vertical rod (10).

Figure 6:
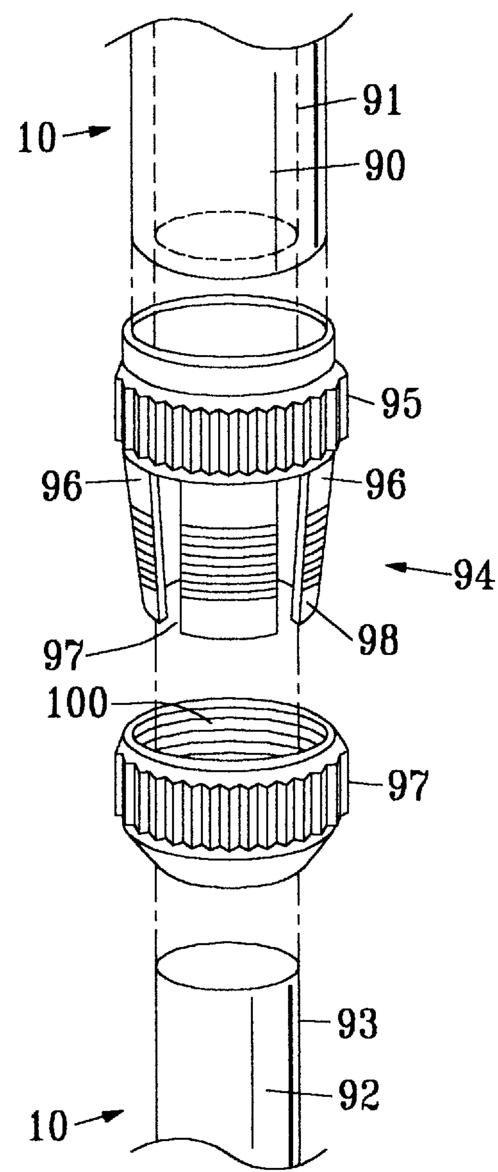
FIG. 6 is a front perspective exploded view of the twist lock and upper portion and lower portion of the vertical rod.

FIG. 6, shows an exploded view of twist lock (94). In this figure the following elements can be seen: upper portion (90) with its inner diameter (91), lower portion (92) with its outer diameter (93), twist lock (94) comprising an upper grip (95), lower grip (99) being hollow with a threaded interior surface (100), downward projecting threaded leafs (96) having gaps (97) between each leaf wherein the thickness of each leaf (96) decreases down their length, interior diameter (98) of leafs (96) being sized to receive the outer diameter (93) of lower portion (92) and interior threaded portion (100). It should be noted that depending on which way lower grip (99) is rotated relative to upper grip (95) leafs (96) may be either tighten or loosened onto the outer diameter (93) surface of lower portion (92). In this configuration rotating lower grip (99) operates to lock the position of lower portion (92) relative to upper portion (90).

Figure 7:
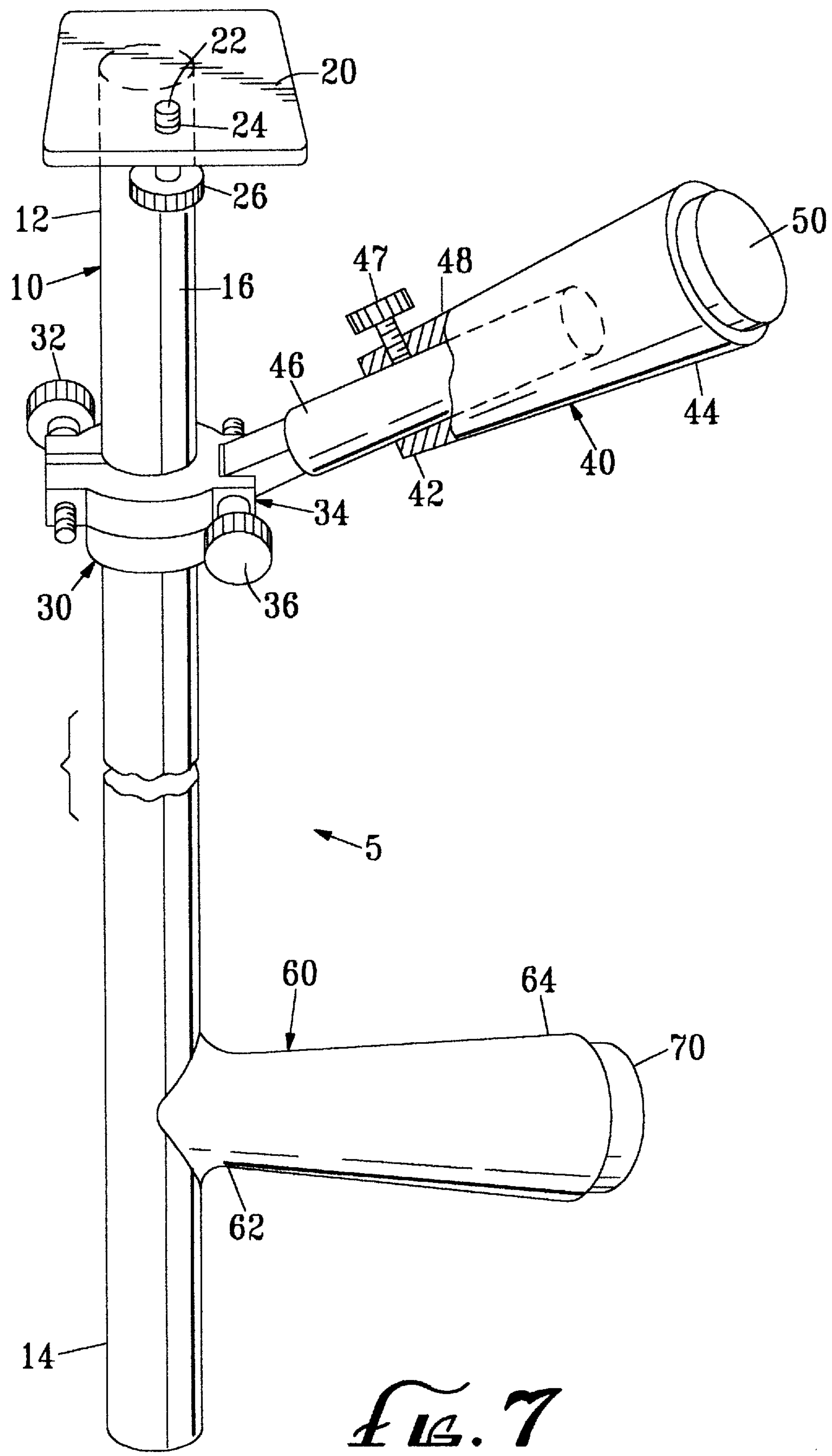
FIG. 7 is a front perspective view of the device showing and alternative attachment and configuration of the lower support arm.

FIG. 7 shows an alternative attachment and configuration of lower support arm (60). As can be seen, first end (62) is mounted directly to vertical rod (10). As such, in this configuration lower arm (60) is not slidably mounted to vertical rod (10). Also, lower support arm (60) has a fixed length which can not be varied as it can in the aforementioned configurations. Finally, lower pad (70), being mounted to lower support arm (60) at its second end (64), is also visible in this figure.

What is claimed is:

1. A camera mount device comprising:

A. a vertical rod having a top end, an opposing bottom end and a length;

B. a camera platform attached to the top end of said vertical rod, said camera platform having a means for securing a photographic camera or similar device on to said camera platform;

C. a vertically positionable bracket slidably mounted to said vertical rod between the top end and bottom end of said vertical rod such that said bracket may be positioned along the length of said vertical rod and rotated laterally about said vertical rod, said bracket having a means for locking said bracket in place along said vertical rod;

D. an upper support arm having a first end, an opposing second end, a length and a longitudinal axis;

E. an upper pad mounted to the second end of said upper support arm; and

F. a means for attaching the first end of said upper support arm to said vertically positionable bracket.

G. a lower support arm having a first end, an opposing second end, a longitudinal axis, and a length, said lower support arm being slidably mounted at its first end to said vertical rod between said vertically positionable bracket and said bottom end of said vertical rod;

H. a means for locking said lower support arm in a fixed position along said vertical rod; and I. a lower pad mounted to the second end of said lower support arm.

2. A camera mount device, as in claim 1, wherein the means for attaching the first end of said upper support arm to said vertically positionable bracket comprises:

A. a joint attached to said vertically positionable bracket and sized to receive and retain the first end of said upper support arm such that said upper support arm may be pivoted vertically about said joint; and B. a means for locking said joint so as to prevent movement of said upper support arm relative to said vertical rod.

3. A camera mount device, as in claim 2, wherein said upper support arm further comprises:

A. a means for varying the length of said upper support arm;

B. a means for locking said upper support arm in a position of its variable length.

4. A camera mount device, as in claim 3, wherein said lower support arm further comprises:

A. a means for varying the length of said lower support arm;

B. a means for locking said lower support arm in a position of its variable length.

5. A camera mount device, as in claim 4, further comprising a lower mount for attaching said camera mount device to a tri-pod, mini-pod or similar device, said lower mount being attached to the lower end of said vertical rod and wherein said vertical rod further comprises a means for varying said length of said vertical rod.

6. A camera mount device comprising:

A. a vertical rod having a top end, an opposing bottom end, and a length;

B. a camera platform attached to the top end of said vertical rod, said camera platform having a means for securing a photographic camera or similar device unto said camera platform;

C. a vertically positionable bracket slidably mounted to said vertical rod between the top end and bottom end of said vertical rod such that said bracket may be positioned along and rotated laterally about said vertical rod, said bracket having a means for locking said bracket in place along said vertical rod, a joint sized to receive and retain the first end of said upper support arm such that said upper support arm may be pivoted vertically about said joint, and a means for locking said joint so as to prevent movement of said upper support arm relative to said vertical rod;

D. an upper support arm having a first end, an opposing second end, a longitudinal axis, a variable length, and a means for varying the length of said upper support arm;

E. an upper pad mounted to the second end of said upper support arm;

F. a lower support arm having a first end, an opposing second end, a longitudinal axis, and a variable length, and a means for varying the length of said lower support arm, said lower support arm being slidably mounted at its first end to said vertical rod between said vertically positionable bracket and said bottom end of said vertical rod;

G. a means for locking said lower support arm in a fixed position along said vertical rod;

H. a lower pad mounted to the second end of said lower support arm.

7. A camera mount device, as in claim 6, wherein said means for varying the length of said upper support arm comprises:

A. a base mounted to the first end of said upper support arm, said base having a longitudinal length substantially aligned with the longitudinal axis of said upper support arm;

B. a slider, slidably mounted to said base at a first end and attached at a second end to the second end of said upper support arm, said second end of said slider being positioned opposite of the first end of said slider portion, said slider being mounted to said base so as to be capable of transversing along the longitudinal length of said base so as to vary the length of said upper support arm.

8. A camera mount device, as in claim 7, wherein said means for varying the length of said lower support arm comprises:

A. a threaded screw mounted along the length of said lower support arm in alignment with the longitudinal axis of said lower support arm;

B. a threaded mount aligned with the longitudinal axis of said lower support arm and sized and shaped to receive said threaded screw such that said threaded mount may be rotated about said threaded screw to alter the length of said lower support arm.

9. A camera mount device, as in claim 8, wherein said means for locking the vertically positionable bracket joint so as to prevent movement of said upper support arm relative to said vertical rod, is a first contact screw mounted to pass through said joint so as to be capable of contacting said first end of said upper support arm, so as to apply sufficient force to prevent movement of said upper support arm relative to said vertical rod.

10. A camera mount device, as in claim 9, wherein said means for locking said vertically positionable bracket in place along said vertical rod comprises a second contact screw mounted through said bracket to contact the exterior surface of said vertical rod so as being capable of exerting sufficient force upon said surface as to prevent movement of said bracket along said vertical rod.

11. A camera mount device as in claim 10, wherein said means for securing a photographic camera or similar device unto said camera platform is a mounting screw having an outward portion positioned to project outward from said camera platform device and sized, shaped and positioned to be received by a screw mount of a camera or similar device.

12. A camera mount device as in claim 11, wherein said mounting screw is rotatably mounted to said camera platform, wherein said mounting screw further comprises an securing knob, said securing knob positioned on said mounting screw sufficiently below the outward projecting portion of said mounting screw so as not to interfere with said mounting screw being received by a screw mount of a camera or similar device, said securing knob being capable of rotating with said mounting screw and being positioned and sized to be manipulated by a user.

13. A camera mount device, as in claim 12, wherein said means for locking said lower support arm in place along said vertical rod comprises a fourth contact screw mounted through said first end of the lower support arm so as to contact the exterior surface of said vertical rod so as being capable of exerting sufficient force upon said surface as to prevent movement of said bracket along said vertical rod.

14. A camera mount device, as in claim 13, further comprising a lower mount for attaching said camera mount device to a tri-pod, mini-pod or similar device, said lower mount being attached to the lower end of said vertical rod and wherein said vertical rod further comprises a means for varying said length of said vertical rod.

15. A camera mount device comprising:

A. a vertical rod having a top end, an opposing bottom end, a length, and an exterior surface;

B. a camera platform attached to the top end of said vertical rod, said camera platform having a mounting screw with an outward portion positioned to project outward from said camera platform device and sized, shaped and positioned to be received by a screw mount of a camera or similar device;

C. an upper support arm having a first end, an opposing second end, a variable length, a longitudinal axis, a fixed portion, a slidable portion, said slidable portion being slidably attached to said fixed portion so as to be capable of transversing along said fixed portion so as to vary the length of said upper support arm, and a means for locking said slidable portion in place along said fixed portion;

D. an upper pad mounted to the second end of said upper support arm;

E. a vertically positionable bracket slidably mounted to said vertical rod between the top end and bottom end of said vertical rod such that said bracket may be positioned along and rotated laterally about said vertical rod, said bracket having a means for locking said bracket in place along said vertical rod, a joint sized to receive and retain the first end of said upper support arm such that said upper support arm may be pivoted vertically about said joint, and a means for locking said joint so as to prevent movement of said upper support arm relative to said vertical rod;

G. a lower support arm attached at its first end to said vertical rod adjacent to said bottom end of said vertical rod, having a first end, an opposing second end, a longitudinal axis, and a variable length, a threaded screw mounted outward from the first end along the length of said lower support arm in alignment with the longitudinal axis of said lower support arm, and a threaded mount attached to said second end aligned with the longitudinal axis of said lower support arm and sized and shaped to receive said threaded screw such that said threaded mount may be rotated about said threaded screw to alter the length of said lower support arm.

I. a lower pad outwardly mounted to the second end of said lower support arm opposing said threaded mount.

16. A camera mount device, as in claim 15, wherein said lower support arm is attached at its first end to said vertical rod adjacent to said lower end, having a first end, an opposing second end, a longitudinal axis, and a fixed length.

17. A camera mount device as in claim 15, wherein said mounting screw is rotatably mounted to said camera platform, wherein said mounting screw further comprises a securing knob, said securing knob positioned on said mounting screw sufficiently below the outward projecting portion of said mounting screw so as not to interfere with said mounting screw being received by a screw mount of a camera or similar device, said securing knob being capable of rotating said mounting screw and being positioned and sized to be manipulated by a user.

18. A camera mount device, as in claim 17, wherein said means for locking said vertically positionable bracket in place along said vertical rod comprises a first contact screw mounted through said bracket to contact the exterior surface of said vertical rod so as being capable of exerting sufficient force upon said surface as to prevent movement of said bracket along said vertical rod.

19. A camera support device, as in claim 18, wherein said means for locking said slidable portion in place along said fixed portion comprises a second contact screw mounted to said slidable portion so as to pass through said slidable portion to contact said fixed portion so as to be capable of exerting a force onto said fixed portion sufficient enough to prevent movement of said slidable portion relative to said fixed portion.

20. A camera mount device, as in claim 19, further comprising a lower mount for attaching said camera mount device to a tri-pod, mini-pod or similar device, said lower mount being attached to the lower end of said vertical rod and wherein said vertical rod further comprises an upper portion and a lower portion, said upper portion being hollow and sized to receive said lower portion such that said lower portion may be slid into said upper portion so that said vertical rod may vary its length in a telescoping manner, and said vertical rod further comprising a means for locking said lower portion in place relative to said upper portion.

* * * * *